United States Patent

Baba et al.

[11] Patent Number: 5,932,137
[45] Date of Patent: *Aug. 3, 1999

[54] SMECTIC LIQUID CRYSTAL COMPOSITION FOR RECORDING DISPLAY MEDIUM, RECORDING DISPLAY MEDIUM AND USE THEREOF

[75] Inventors: Atsushi Baba; Wataru Saito; Isa Nishiyama; Atsushi Yoshizawa, all of Tokyo-To, Japan

[73] Assignees: Dai Nippon Printing Co., Ltd.; Japan Energy Corporation, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/647,822

[22] Filed: May 15, 1996

[30] Foreign Application Priority Data

May 19, 1995 [JP] Japan ................................. 7-144239
Feb. 13, 1996 [JP] Japan ................................. 8-049444

[51] Int. Cl.$^6$ .......................... C09K 19/12; C09K 19/20; G02F 1/13
[52] U.S. Cl. ...................... 252/299.66; 252/299.64; 252/299.65; 252/299.67; 349/2; 349/86; 349/89; 428/1
[58] Field of Search .................... 252/299.01, 299.64, 252/299.65, 299.66, 299.67; 428/1; 349/2, 86, 88, 89

[56] References Cited

U.S. PATENT DOCUMENTS

| | | | |
|---|---|---|---|
| 4,203,862 | 5/1980 | Hsu | 252/299 |
| 5,188,815 | 2/1993 | Coates et al. | 252/299.01 |
| 5,335,101 | 8/1994 | Reamey | 359/52 |
| 5,351,143 | 9/1994 | Sato et al. | 359/51 |

FOREIGN PATENT DOCUMENTS

| | | |
|---|---|---|
| 27 45 050 | 4/1978 | Germany . |
| 2 031 010 | 4/1980 | United Kingdom . |
| 2 080 820 | 2/1982 | United Kingdom . |
| WO 86/04324 | 7/1986 | WIPO . |
| WO 91/09092 | 6/1991 | WIPO . |
| WO 93/21555 | 10/1993 | WIPO . |

OTHER PUBLICATIONS

Patent Abstracts of Japan, vol. 95, No. 10 & JP–A–07 281162 (Japan Energy Corp.), Oct. 27, 1995.
Patent Abstracts of Japan, vol. 95, No. 010 & JP–A–07 261163 (Dai Nippon Printing Co., Ltd.), Oct. 13, 1995.
Patent Abstracts of Japan, vol. 95, No. 10 & JP–A–07 286179 (Japan Energy Corp.), Oct. 31, 1995.

Primary Examiner—Shean C. Wu
Attorney, Agent, or Firm—Parkhurst & Wendel, L.L.P

[57] ABSTRACT

A recording display medium is provided which can offer a high display contrast and is less likely to cause a lowering of contrast or disappearance of display even in low temperature and high temperature regions. A smectic liquid crystal composition, for use in the recording display medium, and use of the recording display medium are also provided. The liquid crystal composition comprises: at least one member selected from the group constituting of compounds represented by the following general formula (I):

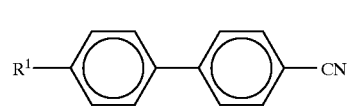

(I)

wherein $R^1$ represents an alkyl or alkoxy group having 8 to 18 carbon atoms; and at least one member selected from the group consisting of compounds represented by the following general formulae (II) to (VII):

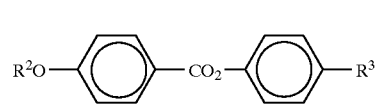

(II)

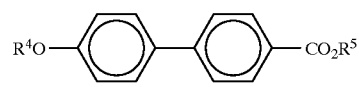

(III)

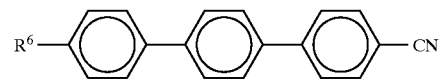

(IV)

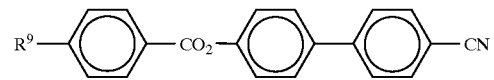

(V)

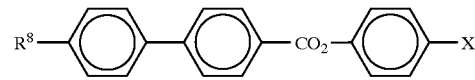

(VI)

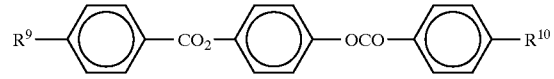

(VII)

wherein $R^2$, $R^4$, $R^5$, and $R^6$ represent an alkyl group having 2 to 18 carbon atoms, $R^3$, $R^7$, $R^8$, $R^9$, and $R^{10}$ represent an alkyl or alkoxy group having 2 to 18 carbon atoms, and X represents a halogen atom or an alkyl or alkoxy group having 2 to 18 carbon atoms.

10 Claims, No Drawings

SMECTIC LIQUID CRYSTAL COMPOSITION FOR RECORDING DISPLAY MEDIUM, RECORDING DISPLAY MEDIUM AND USE THEREOF

BACKGROUND OF THE INVENTION

The present invention relates to a smectic liquid crystal composition for a recording display medium, which is responsive to an electric field or heat to display or record various types of information, a recording display medium comprising, a smectic (liquid crystal)/polymer composite film using the liquid crystal composition, and use thereof. The recording display medium can be widely used as rewritable cards, displays, and other recording display media.

At the present time, liquid crystals are applied as a display material to a variety of equipment and have been put to practical use in watches, clocks, pocket calculators, miniature televisions and the like. A nematic liquid crystal has been used for this purpose, and TN type and STN type display systems have been adopted.

This type of display device comprises a liquid crystal cell having a transparent electrode, a liquid crystal sealed thereinto, and a polarizing plate provided on both sides of the cell. The use of the polarizing plate results in lowered angle of visibility and lack of brightness, necessitating a backlight having high power consumption. In addition, increasing the display area is difficult due to the necessity of even cell thickness, and there are additional problems such as a complicate, structure and a high production cost.

In recent years, display devices using a (liquid crystal)/polymer composite film, wherein a liquid crystal is present in a polymer matrix, have attracted attention as a liquid crystal display medium which can solve the above problems. Among them, those utilizing a smectic liquid crystal enables the liquid crystal to be maintained aligned even after removal of external energy used for alignment of the liquid crystal and, hence, have such a memory effect that the display can be stored for a long period of time, rendering these display devices useful as recording display media.

Not only a high contrast but also a high performance which causes neither lowering of the contrast nor disappearance of display in low temperature and high temperature regions such as encountered in the use under subzero temperatures at outdoors or within cars under the blazing sun is required of the rewritable recording display medium utilizing the smectic liquid crystal. At the present time, there is no recording display medium satisfactorily meeting this requirement.

SUMMARY OF THE INVENTION

Accordingly, an object of the present invention is to provide a recording display medium which has a high contrast and is less likely to cause a lowering of contrast or disappearance of display even in low temperature and high temperature regions.

The above object can be attained by the following present invention. Specifically, the present invention relates to a smectic liquid crystal composition, for a recording display medium, comprising: at least one member selected from the group constituting of compounds represented by the following general formula (I):

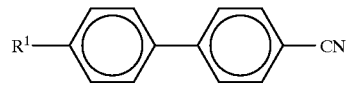
(I)

wherein $R^1$ represents an alkyl or alkoxy group having 8 to 18 carbon atoms; and at least one member selected from the group consisting of compounds represented by the following general formulae (II) to (VII):

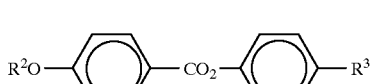
(II)

(III)

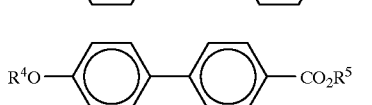

(IV)

(V)

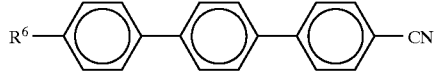

(VI)

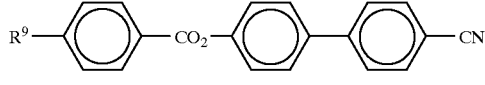

(VII)

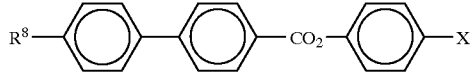

wherein $R^2$, $R^4$, $R^5$, and $R^6$ represent an alkyl group having 2 to 18 carbon atoms, $R^3$, $R^7$, $R^8$, $R^9$, and $R^{10}$ represent an alkyl or alkoxy group having 2 to 18 carbon atoms, and X represents a halogen atom or an alkyl or alkoxy group having 2 to 18 carbon atoms. The present invention further relates to a recording display medium comprising a conductive substrate having thereon a (liquid crystal)/polymer composite film comprising a liquid crystal present in a polymer matrix, wherein the liquid crystal in the (liquid crystal)/polymer composite film comprises the above liquid crystal composition; and use of the recording display medium.

The use of a specific liquid crystal composition as the liquid crystal in the (liquid crystal)/polymer composite type recording display medium can provide a recording display medium which has a high contrast and is less likely to cause a lowering of contrast or disappearance of display even in low temperature and high temperature regions.

DETAILED DESCRIPTION OF THE PREFERRED EMBODIMENTS

The present invention will now be described in more detail with reference to preferred embodiments. Liquid crystals usable in the formation of the recording display medium of the present invention are compounds represented by the general formulae (I) to (VII). Among these liquid crystals, 4-alkyl-4'-cyanobiphenyl or 4-alkoxy-4'-cyanobiphenyl, having 8 to 18 carbon atoms, represented by the general formula (I) exhibits a stable smectic liquid crystal phase around room temperature and, in the form of a (liquid crystal)/polymer composite film type recording display medium, provides a good contrast. Any one of these compounds may be used. In order to provide a stable smectic liquid crystal phase in a wider temperature range, at least two of these compounds may be properly selected and used in combination. 4-Alkyl-4'-cyanobiphenyl or 4-alkoxy-4'-cyanobiphenyl compounds, having 7 or less carbon atoms, when used alone, do not exhibit a smectic liquid crystal phase. However, the addition of the above compound having 8 to 18 carbon atoms to these compounds enables adjustment to be made to a temperature region where a smectic liquid crystal phase is exhibited. Further, it can provide a more stable smectic liquid crystal phase. In this case, preferably, the 4-alkyl-4'-cyanobiphenyl or 4-alkoxy-4'-cyanobiphenyl compound having 8 to 18 carbon atoms is added in an amount of at least 40% by weight to all the 4-alkyl-4'-cyanobiphenyl or 4-alkoxy-4'-cyanobiphenyl compounds from the viewpoint of providing a stable smectic liquid crystal phase.

The above compounds are known in the art (for example, Kusabayashi, "EKISHOU ZAIRYO," p. 229, published by Kodansha Ltd. (1991)), and, for example, 4-alkyl-4'-bromovinylphenyl or 4-alkoxy-4'-bromobiphenyl can be reacted with copper cyanide to give a corresponding 4-alkyl-4'-cyanobiphenyl or 4-alkoxy-4'-cyanobiphenyl. Some of these compounds are commercially available.

The use of a compound having a high phase transition temperature, between the smectic liquid crystal phase and the nematic liquid crystal phase or between the smectic liquid crystal phase and the isotropic phase, as the compound represented by the general formula (I), can enhance the storage stability of records in the recording display medium in a high temperature region. However, it gives rise to an increase in melting point and, when the recording display medium is allowed to stand at a low temperature, causes the orientation of the liquid crystal to be disturbed, resulting in a lowering of contrast or disappearance of display in the recording display area.

For this reason, the present inventors have made studies with a view to increasing the phase transition temperature between the smectic liquid crystal phase and the nematic liquid crystal phase or between the smectic liquid crystal phase and the isotropic phase while keeping the melting temperature low and, as a result, have found that the addition of at least one of the compounds represented by the general formulae (II) to (VII) to the compound represented by the general formula (I) can realize this.

The 4-alkylphenyl 4-alkoxybenzoate compounds or 4-alkoxyphenyl 4-alkoxybenzoate compounds represented by the general formula (II) are known in the art (for example, Flüssige Kristalle in Tabellen, VED Deutscher Verlag für Grundstoffindustrie Leipzig, pp. 63–69, 1976) and can be prepared, for example, by esterifying a 4-alkylphenol with a 4-alkoxy benzoic acid using a dicyclohexylcarbodiimide or the like as a dehydrating agent, and some of these compounds are commercially available.

The 4-alkoxybiphenyl-4'-carboxylic acid alkyl ester compounds represented by the general formula (III) are known in the art [for example, Mol. Cryst. Liq. Cryst., 37, pp. 157–188 (1976)] and can be simply prepared, for example, by esterifying an alkanol with a 4-alkoxybiphenyl-4'-carboxylic acid in the presence of an acid catalyst such as sulfuric acid.

The 4-alkyl-4"-cyano-p-terphenyl compounds represented by the general formula (IV) are known in the art [for example, Mol. Cryst. Liq. Cryst., 38, pp. 345–352 (1977)] and can be prepared, for example, by treating a 4-alkyl-p-terphenyl-4"-carboxylic acid chloride with aqueous ammonia to give a 4-alkyl-p-terphenyl-4"-carboxylic acid amide which is then reacted with phosphorus pentoxide. Some of these compounds are commercially available.

The 4'-cyanobiphenyl 4-alkylbenzoate or 4'-cyanobiphenyl 4-alkoxybenzoate compounds represented by the general formula (V) are known in the art (for example, Flüssige Kristalle in Tabellen II, VED Deutscher Verlag für Grundstoffindustrie Leipzig, pp. 287–288, 1984) and can be prepared, for example, by esterifying a 4-alkylbenzoic acid or a 4-alkoxybenzoic acid with 4-cyano-4'-hydroxybiphenyl using a dicyclohexylcarbodiimide or the like as a dehydrating agent.

Among the compounds represented by the general formula (VI), most of the 4-alkoxybiphenyl-4'-carboxylic acid 4-halophenyl ester compounds, 4-alkoxybiphenyl-4'-carboxylic acid 4-alkylphenyl ester compounds, 4-alkoxybiphenyl-4'-carboxylic acid 4-alkoxyphenyl ester compounds, 4-alkylbiphenyl-4'-carboxylic acid 4-halophenyl ester compounds, 4-alkylbiphenyl-4'-carboxylic acid 4-alkylphenyl ester compounds, and 4-alkylbiphenyl-4'-carboxylic acid 4-alkoxyphenyl ester compounds are known in the art (for example, Flüssige Kristalle in Tabellen II, VED Deutscher Verlag für Grundstoffindustrie Leipzig, pp. 295–300, 1984) and can be prepared, for example, by esterifying a 4-alkoxybiphenyl-4'-carboxylic acid or a 4-alkylbiphenyl-4'-carboxylic acid with a 4-halophenol or a 4-alkylphenol using a dicyclohexylcarbodiimide or the like as a dehydrating agent. The halogen element in these compounds may be of any kind. However, fluorine or chlorine is preferred from the viewpoint of chemical stability.

The p-phenylene-di 4-alkylbenzoate compounds, p-phenylene-di 4-alkoxybenzoate compounds, and p-phenylene 4-alkylbenzoic acid-4-alkoxybenzoate compounds represented by the general formula (VII) are known in the art [for example, J. Org. Chem., 37 (9), p. 1425 (1972)] and can be prepared, for example, by reacting a p-alkylbenzoyl chloride or a p-alkoxybenzoyl chloride with hydroquinone under basic conditions and then reacting the reaction product with a p-alkylbenzoyl chloride or a p-alkoxybenzoyl chloride under basic conditions.

The compounds represented by the general formulae (II) to (VII) serve to increase the smectic-nematic phase transition temperature or the smectic-isotropic phase transition temperature. The storage stability of records at high temperatures becomes better with increasing the phase transition temperature, and the phase transition temperature is preferably 60° C. or above, particularly preferably 60 to 130° C. However, when the phase transition temperature is excessively high, the state of orientation of liquid crystal molecules is less likely to be changed upon application of heat or an electric field. Therefore, a high phase transition temperature can enhance the storage stability of records in the recording display medium in a high temperature region but requires high thermal energy or strong electric field for printing or erasing of information by application of heat or an electric field. For this reason, what is most important here is that records can be stored in the temperature range of from around −40 to 100° C., i.e., under usual service conditions of the recording display medium.

At least one compound or two or more compounds in combination which are properly selected from the above compound species so as to meet the above requirement may be used. Among the compounds represented by the general formulae (II) to (VII), those wherein the alkyl or alkoxyl group has 2 to 18 carbon atoms are easily available. They have a phase transition temperature suitable for practical use and, in addition, are excellent in stability of the liquid crystalline phase.

The compounds represented by the general formulae (II) to (VII) are incorporated in an amount of preferably 10 to 300 parts by weight, particularly preferably 20 to 240 parts by weight, based on 100 parts by weight of the compound represented by the general formula (I).

Incorporation of 1 to 220 parts by weight, preferably 5 to 100 parts by weight, of at least one compound selected from the compounds represented by the general formulae (IV) to (VII) into 100 parts by weight of a mixture of the compound represented by the general formula (I) and the compound represented by the general formula (II) in a weight ratio of preferably 80:20 to 30:70, particularly preferably 60:40 to 40:60 is preferred because it can provide a liquid crystal composition which has a high contrast and causes neither a lowering of contrast nor disappearance of display in a high temperature region as well as in a low temperature region, for example, at −40° C.

Other liquid crystalline compounds or additives may be added to the liquid crystal composition so far as they do not destroy the smectic liquid crystalline phase. In particular, the incorporation of a dichroic dye in an amount of 1 to 10 parts by weight based on 100 parts by weight of the liquid crystal composition is favorable for improving the contrast ratio or coloring or other purposes.

The liquid crystal composition can be used to form a (liquid crystal)/polymer composite film comprising a liquid crystal composition present in a polymer matrix on a conductive substrate, thereby preparing the recording display medium of the present invention. Specific preferred embodiment for the preparation of the (liquid crystal)/polymer composite film will now be described. However, the present invention is not limited to these examples only.

Any polymeric material having low compatibility with the liquid crystal composition and excellent transparency and film-forming properties may be used as a polymeric material for constituting the polymer matrix which serves to fix the liquid crystal composition. More specifically, for example, water-soluble polymeric materials having excellent transparency and film-forming properties, such as polyvinyl alcohol, gelatin, acrylic acid copolymer, and water-soluble alkyd resins, may be used, and any suitable polymeric material may be selected and used according to methods of forming the composite film.

The liquid crystal composition and the polymer matrix are used in a polymer matrix to liquid crystal mixing ratio (weight ratio) of 5:95 to 80:20. When the amount of the liquid crystal used is excessively small, the transparency is unsatisfactory during the application of an electric field and, at the same time, a very high electric field is necessary for bringing the film to a transparent state. On the other hand, the use of an excessively large amount of the liquid crystal results in unsatisfactory scattering (turbidity) when the electric field is off. Further, in this case, the strength of the film is deteriorated.

The liquid crystal composition may be dispersed in the polymer matrix by any conventional method such as a phase separation or emulsion method. The emulsion method is most useful. Therefore, the dispersion of the liquid crystal composition in the polymer matrix will be described with reference to the emulsion method as a representative example. The present invention, however, is not limited to the emulsion method.

The emulsion method comprises emulsifying and dispersing a liquid crystal composition in a medium composed mainly of water and optionally containing a surfactant and a protective colloid, adding a water-soluble or water-dispersible polymeric material, such as polyvinyl alcohol, gelatin, an acrylic acid copolymer, or a water-soluble alkyd resin, in the resultant emulsion, coating the mixture onto a suitable substrate, and drying the coating to form a film having a suitable thickness. According to this method, a (liquid crystal)/polymer composite film is formed wherein a liquid crystal is homogeneously dispersed in the resultant film.

Useful methods for emulsification and dispersion of the liquid crystal in the aqueous solution or water dispersion of the polymer matrix include mixing by means of various agitators such as an ultrasonic dispergator, and dispersing such as film emulsification [see Tadao Nakajima/Masataka Shimizu, PHARMTECH JAPAN, Vol. 4, No. 10 (1988)]. For example, when an O/W emulsion for a liquid crystal is prepared using a porous glass (MPG) film emulsification system, the average particle diameter of the liquid crystal to be emulsified and dispersed can be varied, as desired, by varying the average pore diameter of MPG used.

The formation of a (liquid crystal)/polymer composite film, on an electrode substrate, using the above liquid crystal emulsion can be carried out, for example, by electrodeposition coating, screen printing, stencil printing using a metallic mask, brush coating, spray coating, blade coating, doctor coating, or roll coating such as gravure printing.

The electrode substrate (conductive substrate) used in the present invention may be any conductive substrate commonly used in conventional recording display media, and specific examples thereof include a pair of electrode substrates wherein a transparent conductive material, such as an ITO, $SnO_2$-based, or ZnO-based material, is deposited onto a transparent substrate such as glass or a polymer film. In this case, when an opaque conductive substrate is used as the other substrate, for example, a substrate with a reflective electrode of aluminum provided thereon is preferred because the opaque substrate is required to serve also as a reflector. The substrate per se may be made of glass, a polymer film or other material.

As described above, after a (liquid crystal)/polymer composite film is formed on an electrode substrate, it is dried at room temperature or such a temperature as will have no influence on the liquid crystal, thereby preparing the (liquid crystal)/polymer composite film of the present invention. In this case, the thickness of the (liquid crystal)/polymer composite film is generally about 3 to 23 μm. When it is less than 3 μm, the contrast of the display is lowered, while when it exceeds 23 μm, the driving electric field is unfavorably high.

According to one preferred embodiment of the present invention, there is provided a recording display medium comprising a (liquid crystal)/polymer composite film provided between a pair of conductive substrates with at least one of the substrates being transparent, the (liquid crystal)/polymer composite film comprising a liquid crystal composition present in a polymer matrix. Regarding the drive of the recording display medium, information stored in the recording display medium is erased by the application of an electric field, while information is written into the recording display medium by the application of heat. Conversely, it is also possible to adopt a driving method wherein the information is erased by the application of heat, while the information is written by the application of an electric field.

According to another preferred embodiment of the present invention, there is provided an information display medium comprising the above liquid/polymer composite film provided on a conductive substrate and a protective layer, provided on the (liquid crystal)/polymer composite film, optionally through an intermediate layer. In this type of rewritable recording display medium, the application of an electric field through the protective layer gives rise to orientation of the liquid crystal to permit light to pass therethrough, thereby erasing or writing information, and heating causes the orientation of the liquid crystal to be disturbed, thereby writing or erasing the information.

In the above rewritable recording display medium, the intermediate layer may be formed of the same resin as used in the polymer matrix, and the protective layer may be formed of a thermosetting resin, an ultraviolet-curing resin, or an electron beam-curing resin, for example, a polyene-thiol, a polymerizable acrylate polymer, having in its molecule a (meth)acryloyl group, such as urethane acrylate, epoxy acrylate, or silicone acrylate, or a known curing resin comprising a monofunctional or polyfunctional monomer such as methyl methacrylate.

This embodiment will be described by taking an information rewritable card as an example.

In the case of an information rewritable card, only one electrode is used. The substrate for the electrode is particularly preferably a polymer film. A white polyethylene terephthalate (PET) film is desired. A metal, such as aluminum, besides a transparent conductive material, such as ITO, may be used for the conductive layer. Further, a protective layer is provided for protecting the liquid/polymer composite film. Although the material for the protective film is not particularly limited, a curing resin having mechanical strength, water resistance or other properties is preferred.

For example, UV- or electron beam-curing poly(meth) acrylate or polyurethane (meth)acrylate is used. When the above protective layer cannot be formed directly on the (liquid crystal)/polymer composite film, a thin film of a water-soluble polymer, such as polyvinyl alcohol, may be formed as an intermediate layer between the composite film and the protective film. Alternatively, the above protective film material formed on a separate sheet may be transferred or laminated and then cured to form a protective layer.

In the case of an information rewritable card, the suitable range of the ratio of the liquid crystal to the polymer is different from that in the case of the display, and the weight ratio of the liquid crystal to the polymer is preferably 55 to 45 to 20:80. Further, the incorporation of a dichroic dye into the liquid crystal is preferred from the viewpoint of increasing the contrast of display.

For the card having the above construction, recording and erasing of information will now be described.

Information is erased by applying an electric field on the whole surface of the (liquid crystal)/polymer composite film and written into the card by taking advantage of heat. This is repeated to rewrite information. Alternatively, information may be rewritten by applying heat to the whole surface of the composite film to erase information, writing information by applying an electric field, and repeating the above procedure. When an electric field is applied, heating of the (liquid crystal)/polymer composite film is expected to permit liquid crystalline molecules to satisfactorily align in a short time. Therefore, this is preferably carried out according to the situation. Corona discharge is particularly useful for applying an electric field. On the other hand, a method using a thermal head is preferred for applying heat.

The liquid crystal composition used in the present invention or the liquid crystal composition containing a dichroic dye (hereinafter referred to simply as "liquid crystal") may be enmicrocapsulated. The enmicrocapsulation may be carried out by the following preferred method.

Specifically, a capsule wall film for surrounding the liquid crystal can be prepared by emulsifying or dispersing the liquid crystal in a water medium with the aid of a free radical reactive surfactant, a water-soluble protective colloid, or a radical reactive protective colloid or a mixture of two or more of them, dissolving or dispersing a free-radical initiator in water or the liquid crystal, and heating the system to the decomposition temperature of the initiator.

Alternatively, a capsule wall film for surrounding the liquid crystal may be prepared by emulsifying and dispersing a liquid crystal dissolved in a free-radical reactive monomer in a water medium with the aid of a water-soluble protective colloid, dissolving or dispersing a free-radical initiator in water or the liquid crystal, and heating the system to the decomposition temperature of the initiator.

The free-radical reactive surfactant may be a commercially available ionic or nonionic reactive surfactant, and examples thereof include sodium styrenesulfonate, polyethylene glycol diacrylate, and polypropylene glycol polytetramethylene glycol. A mixture of bi- or higher functional surfactants is preferred. Examples of the water-soluble protective colloid include partially saponified polyvinyl alcohol, hydroxyethyl cellulose, and polyethylene glycol.

The free-radical reactive protective colloid may be any one having an addition-polymerizable double bond, such as a polymer having a hydrophilic group and a hydrophobic group with a free-radical reactive group introduced into the side chain thereof, for example, a (partially saponified) polyvinyl alcohol with an acryloyl group introduced into the hydroxyl group thereof.

The free-radical polymerizable monomer to be dissolved in the liquid crystal may be a monomer, compatible with the liquid crystal, such as styrene, vinyl acetate, or (meth)acrylic ester. Preferably, a bi- or higher functional monomer is mixed with the free-radical polymerizable monomer.

The polymerization initiator may be any of water-soluble and oil-soluble polymerization initiators. When raising the polymerization temperature is unfavorable, a redox polymerization initiator may be used. Further, it is also possible to initiate the polymerization by means of ionizing radiation such as γ rays or electron beams.

In the enmicrocapsulated liquid crystal having the above construction, the amount of the polymeric material used as the wall material is preferably in the range of from 5 to 25 parts by weight based on 100 parts by weight of the smectic liquid crystal as the core substance. When the amount of the wall material used is less than the above range, the thickness of the wall is so small that a problem of oozing of the liquid crystal cannot be fully solved.

On the other hand, when it exceeds the above range, the thickness of the wall is so large that, when a dichroic dye is used, the amount of the dichroic dye incorporated into the wall is increased. This causes the wall to be colored, posing problems including that the reflection density does not become satisfactorily low at the time of application of an electric field. The thickness of the wall in the encapsulated state may vary depending upon the liquid crystalline material, polymeric material, encapsulation method and the like. It, however, is generally about 10 to 100 nm.

The present invention will now be described in more detail with reference to the following examples and comparative examples.

Preparation of Liquid Crystal Compositions

Liquid crystal compounds listed in Table 1 were provided and mixed in various combinations as specified in Table 2 to prepare liquid crystal compositions.

TABLE 1

Compounds of general formula (I)

I-1: $C_8H_{17}$—⟨⟩—⟨⟩—CN

I-2: $C_9H_{19}$—⟨⟩—⟨⟩—CN

I-3: $C_{10}H_{21}$—⟨⟩—⟨⟩—CN

I-4: $C_{11}H_{23}$—⟨⟩—⟨⟩—CN

TABLE 1-continued

I-5: $C_{12}H_{25}$—⟨⟩—⟨⟩—CN

I-6: $C_8H_{17}O$—⟨⟩—⟨⟩—CN

I-7: $C_9H_{19}O$—⟨⟩—⟨⟩—CN

I-8: $C_{10}H_{21}O$—⟨⟩—⟨⟩—CN

I-9: $C_{12}H_{25}O$—⟨⟩—⟨⟩—CN

Compounds of general formula (II)

II-1: $C_6H_{13}O$—⟨⟩—COO—⟨⟩—$C_5H_{11}$

II-2: $C_8H_{17}O$—⟨⟩—COO—⟨⟩—$C_5H_{11}$

II-3: $C_8H_{17}O$—⟨⟩—COO—⟨⟩—$OC_4H_9$

II-4: $C_8H_{17}O$—⟨⟩—COO—⟨⟩—$OC_5H_{11}$

II-5: $C_8H_{17}O$—⟨⟩—COO—⟨⟩—$OC_7H_{15}$

II-6: $C_8H_{17}O$—⟨⟩—COO—⟨⟩—$OC_8H_{17}$

II-7: $C_8H_{17}O$—⟨⟩—COO—⟨⟩—$OC_9H_{19}$

II-8: $C_9H_{19}O$—⟨⟩—COO—⟨⟩—$OC_7H_{15}$

II-9: $C_{10}H_{21}O$—⟨⟩—COO—⟨⟩—$OC_6H_{13}$

II-10: $C_{12}H_{25}O$—⟨⟩—COO—⟨⟩—$OC_6H_{13}$

Compounds of general formula (III)

III-1: $C_8H_{17}O$—⟨⟩—⟨⟩—COO—$C_4H_9$

III-2: $C_9H_{19}O$—⟨⟩—⟨⟩—COO—$C_4H_9$

TABLE 1-continued

Compounds of general formula (IV)

IV-1: 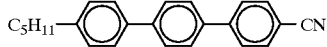

Compounds of general formula (V)

V-1: 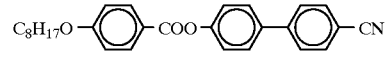

V-2: 

Compounds of general formula (VI)

VI-1: 

VI-2: 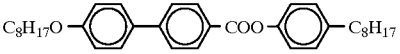

VI-3: 

VI-4: 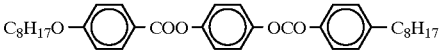

Compounds of general formula (VII)

VII-1: 

VII-2: C$_8$H$_{17}$O—〇—COO—〇—OCO—〇—OC$_8$H$_{17}$

TABLE 2

| Composition A (wt %) | | Composition B (wt %) | | Composition C (wt %) | | Composition D (wt %) | |
|---|---|---|---|---|---|---|---|
| I-2 | 33.3 | I-3 | 17.2 | I-2 | 48.0 | I-2 | 26.8 |
| I-7 | 16.7 | I-5 | 17.2 | I-7 | 24.0 | I-7 | 13.2 |
| II-1 | 20.0 | I-8 | 4.3 | I-8 | 8.0 | II-1 | 16.0 |
| II-2 | 30.0 | I-9 | 3.8 | IV-1 | 20.0 | II-2 | 24.0 |
|  |  | II-1 | 17.0 |  |  | V-1 | 20.0 |
|  |  | II-2 | 25.5 |  |  |  |  |
|  |  | III-2 | 15.0 |  |  |  |  |

| Composition E (wt %) | | Composition F (wt %) | | Composition G (wt %) | | Composition H (wt %) | |
|---|---|---|---|---|---|---|---|
| I-2 | 23.4 | I-3 | 18.2 | I-3 | 16.2 | I-3 | 14.2 |
| I-7 | 11.6 | I-5 | 18.2 | I-5 | 16.2 | I-5 | 14.2 |
| II-1 | 14.0 | I-8 | 4.5 | I-8 | 4.0 | I-8 | 3.5 |
| II-2 | 21.0 | I-9 | 4.1 | I-9 | 3.6 | I-9 | 3.1 |
| V-1 | 30.0 | II-1 | 18.0 | II-1 | 16.0 | II-1 | 14.0 |
|  |  | II-2 | 27.0 | II-2 | 24.0 | II-2 | 21.0 |
|  |  | IV-1 | 10.0 | V-1 | 20.0 | IV-1 | 30.0 |

| Composition I (wt %) | | Composition J (wt %) | | Composition K (wt %) | | Composition L (wt %) | |
|---|---|---|---|---|---|---|---|
| I-1 | 23.5 | I-1 | 23.5 | I-3 | 18.2 | I-3 | 18.2 |
| I-2 | 15.7 | I-2 | 15.7 | I-5 | 18.2 | I-5 | 18.2 |
| I-6 | 16.8 | I-6 | 16.8 | I-8 | 4.5 | I-8 | 4.5 |
| III-1 | 15.0 | III-1 | 15.0 | I-9 | 4.1 | I-9 | 4.1 |
| III-2 | 4.0 | III-2 | 4.0 | II-1 | 18.0 | II-1 | 18.0 |
| IV-1 | 25.0 | V-1 | 15.0 | II-2 | 27.0 | II-2 | 27.0 |
|  |  | V-2 | 10.0 | VI-1 | 10.0 | VI-2 | 10.0 |

| Composition M (wt %) | | Composition N (wt %) | | Composition O (wt %) | | Composition P (wt %) | |
|---|---|---|---|---|---|---|---|
| I-3 | 17.2 | I-5 | 17.2 | I-5 | 18.2 | I-5 | 20.3 |
| I-5 | 17.2 | I-3 | 17.2 | I-3 | 18.2 | I-3 | 20.2 |
| I-8 | 4.3 | I-9 | 3.8 | I-9 | 4.1 | I-9 | 4.5 |
| I-9 | 3.8 | I-8 | 4.3 | I-8 | 4.5 | I-8 | 5.0 |
| II-1 | 17.0 | II-1 | 17.0 | II-1 | 18.0 | II-3 | 12.5 |
| II-2 | 25.5 | II-2 | 25.5 | II-2 | 27.0 | II-5 | 12.5 |
| VII-1 | 7.5 | VI-4 | 15.0 | VI-3 | 10.0 | II-7 | 12.5 |
| VII-2 | 7.5 |  |  |  |  | II-8 | 12.5 |

| Composition Q (wt %) | | Composition R (wt %) | | Composition S (wt %) | | Composition T (wt %) | |
|---|---|---|---|---|---|---|---|
| I-5 | 17.4 | I-5 | 16.2 | I-5 | 12.2 | I-5 | 12.2 |
| I-3 | 17.4 | I-3 | 16.2 | I-3 | 12.1 | I-3 | 12.1 |
| I-9 | 3.9 | I-9 | 3.6 | I-9 | 2.7 | I-9 | 2.7 |
| I-8 | 4.3 | I-8 | 4.0 | I-8 | 3.0 | I-8 | 3.0 |
| II-3 | 14.0 | II-3 | 5.0 | II-3 | 10.0 | II-3 | 5.0 |
| II-6 | 14.0 | II-4 | 5.0 | II-6 | 15.0 | II-4 | 5.0 |
| II-10 | 14.0 | II-6 | 10.0 | II-10 | 30.0 | II-6 | 5.0 |
| IV-1 | 15.0 | II-9 | 5.0 | IV-1 | 15.0 | II-8 | 5.0 |
|  |  | II-10 | 15.0 |  |  | II-10 | 25.0 |
|  |  | IV-1 | 20.0 |  |  | IV-1 | 25.0 |

| Composition U (wt %) | | Composition V (wt %) | |
|---|---|---|---|
| I-3 | 12.1 | I-1 | 42.0 |
| I-5 | 12.2 | I-2 | 28.0 |
| I-8 | 3.0 | I-6 | 30.0 |
| I-9 | 2.7 |  |  |
| II-3 | 5.0 |  |  |
| II-4 | 5.0 |  |  |
| II-6 | 5.0 |  |  |
| II-8 | 5.0 |  |  |
| II-10 | 20.0 |  |  |
| IV-1 | 30.0 |  |  |

Measurement of Properties

The above compositions were poured into a cell, which has a thickness of 12 μm, is provided with an aligning film of the polyimide, and has been subjected to parallel rubbing treatment, and the phase transition was observed under a polarizing microscope to measure the phase transition temperature at the time of temperature falling (−2° C./min). The results are given in Table 3. In Table 3, I represents an isotropic liquid, $S_A$ a smectic A phase, $S_c$ a smectic C phase, $S_X$ a smectic X phase (the X phase being a smectic phase which cannot be identified as a general phase, such as $S_A$), N a nematic phase, and C a crystal. Further, −20↓ represents that the phase transition temperature is −20° C. or below.

EXAMPLE 1

0.04 part by weight of a dichroic dye (S-428, manufactured by Mitsui Toatsu Chemicals, Inc.) was added to 2 parts by weight of each of the liquid crystal compositions A to V prepared above (the liquid crystal composition V being a comparative composition), and 8.16 parts by weight of a 10 wt % aqueous solution of PVA (EG-05, manufactured by Nippon Synthetic Chemical Industry Co., Ltd.; degree of polymerization 500; degree of saponification 86.5 to 89.0) was added thereto, followed by mechanical dispersion.

12.24 g of a 10 wt % aqueous solution of PVA (KH-20, manufactured by Nippon Synthetic Chemical Industry Co., Ltd.; degree of polymerization 2000; degree of saponification 78.5 to 81.5) was added as a thickening agent to the dispersions, and the mixtures were stirred.

The dispersions were each coated on an ITO-deposited white PET substrate by means of a doctor blade, and the coatings were dried to form (liquid crystal)/polymer composite films.

A 10 wt % aqueous solution of PVA (KH-20, manufactured by Nippon Synthetic Chemical Industry Co., Ltd.; degree of polymerization 2000; degree of saponification 78.5 to 81.5) was coated on the (liquid crystal)/polymer composite films by means of a doctor blade, and the resultant coatings were dried to form intermediate layers. Subsequently, an ultraviolet curable resin (urethane acrylate) was coated on the whole surface of each intermediate layer by means of a doctor blade, and the resultant coatings were cured by irradiation with ultraviolet light from a high-pressure mercury lamp (output: 120 W/cm$^2$) to form protective layers.

For recording display media using the (liquid crystal)/polymer composite films thus prepared, corona discharge (corona voltage: 6.5 kV) gave rise to an erased state, while thermal recording by means of a thermal head or the like gave rise to writing of black on a white ground.

The reflection density of the written area of the recording display media in the above written state and the reflection density of the erased area were measured at room temperature with a color densitometer (RD 914-S, manufactured by Mcbeth), the recording display media were stored in a thermostatic chamber at 60° C. and −40° C. for 90 hr. The reflection density of the erased state was then measured, and the percentage change of reflection density in the erased state by the following equation. The results are given as the storage stability in Table 3.

$$\text{Change of reflection density (\%)} = \frac{\text{Reflection density of erased area after storing} - \text{Initial reflection density of erased area}}{\text{Initial reflection density of written area} - \text{Initial reflection density of erased area}} \times 100$$

Further, the reflection density in the erased state was determined by taking the reflection density in the written state as 1.00, and the reflection density in the erased state was subtracted from the reflection density in the written state to determine the contrast. The results are also summarized in Table 3.

As is apparent from the results, the compositions of the present invention is superior to the composition V as a comparative example consisting of the compound represented by the general formula (I) alone in high-temperature storage stability, low-temperature storage stability, and contrast.

TABLE 3

| Composition | Phase transition temp. (°C.) | Storage stability 60° C. | Storage stability −40° C. | Contrast |
|---|---|---|---|---|
| A | I(71)S$_A$(−20↓)C. | 73 | 5 | 0.49 |
| B | I(72)S$_A$(−20↓)C. | 94 | 6 | 0.38 |
| C | I(91)N(80)S$_A$(−11)S$_C$(−17)C. | 55 | 86 | 0.49 |
| D | I(86)N(81)S$_A$(−20↓)C. | 49 | 7 | 0.39 |
| E | I(101)N(89)S$_A$(−20↓)C. | 52 | 13 | 0.49 |
| F | I(82)S$_A$(−20↓)C. | 61 | 5 | 0.39 |
| G | I(97)N(94)S$_A$(−19)C. | 51 | 44 | 0.32 |
| H | I(113)N(100)S$_A$(10)C. | 32 | 26 | 0.54 |
| I | I(94)N(79)S$_A$(77)S$_X$(−20↓)C. | 55 | 28 | 0.26 |
| J | I(88)N(74)S$_A$(19)S$_X$(−20↓)C. | 86 | 46 | 0.47 |
| K | I(85)S$_A$(−20↓)C. | 62 | 18 | 0.47 |
| L | I(85)S$_A$(−20↓)C. | 51 | 16 | 0.48 |
| M | I(83)S$_A$(−20↓)C. | 46 | 11 | 0.46 |
| N | I(88)S$_A$(−16)C. | 63 | 3 | 0.37 |
| O | I(84)S$_A$(−20↓)C. | 76 | 2 | 0.40 |
| P | I(85)S$_A$(−12)C. | 30 | 7 | 0.34 |
| Q | I(98)S$_A$(−18)C. | 17 | 1 | 0.40 |
| R | I(110)S$_A$(−17)C. | 9 | 1 | 0.45 |
| S | I(111)S$_A$(−20↓)C. | 3 | 3 | 0.24 |
| T | I(117)S$_A$(−20↓)C. | 6 | −5 | 0.36 |
| U | I(124)S$_A$(−20↓)C. | 3 | −5 | 0.35 |
| V | I(55)N(47)S$_A$(−6)C | 92 | 61 | 0.19 |

Note: Composition V is a comparative example.

As described above, according to the present invention, the use of a smectic liquid crystal having a high smectic phase/nematic phase or smectic phase/isotropic phase transition phase transition temperature in a (liquid crystal)/polymer composite film can solve problems of the prior art, such as disappearance of the recorded area in the recording display medium under high temperature conditions and, at the same time, can provide various recording display medium having improved reliability and stability as a device.

What is claimed is:

1. A smectic liquid crystal composition for a recording display medium, said composition having a phase transition temperature of at least 60° C. between a smectic-nematic phase or a smectic-isotropic phase and comprising at least one member selected from the group consisting of compounds represented by the following general formula (I):

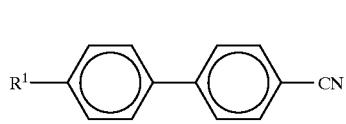

(I)

wherein R$^1$ represents an alkyl or alkoxy group having 8 to 18 carbon atoms; and at least two members selected from the group consisting of compounds represented by the following general formulae (II) to (VII):

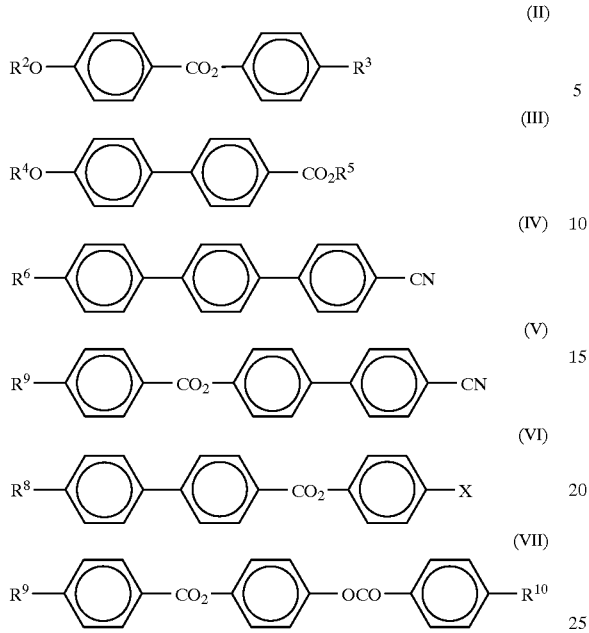

wherein $R^2$, $R^4$, $R^5$, and $R^6$ represent an alkyl group having 2 to 18 carbon atoms, $R^3$, $R^7$, $R^8$, $R^9$, and $R^{10}$ represent an alkyl or alkoxy group having 2 to 18 carbon atoms, and X represents a halogen atom or an alkyl or alkoxy group having 2 to 18 carbon atoms, said compounds represented by the general formulae (II) to (VII) being incorporated in an amount of 20 to 240 parts by weight based on 100 parts by weight of the compound represented by the general formula (I) with the proviso that the composition contains at least one compound of formula (I) wherein $R^1$ is an alkyl or alkoxy group having 8 to 18 carbon atoms in an amount of at least 40% by weight to all of the 4-alkyl-4'-cyanobiphenyl or 4-alkoxy-4'-cyanobiphenyl compounds that have an alkyl or alkoxy group having any number of carbon atoms and with the further proviso that the composition contains no compound represented by any of formulae (II) to (VI) wherein $R^2$, $R^4$, and $R^6$ represent an alkyl group having less than 2 carbon atoms, $R^7$ and $R^8$ represent an alkyl group or alkoxy group having less than 2 carbon atoms, $R^5$ represents an alkyl group, $R^3$ represents an alkyl or alkoxy group, and X represents a halogen atom or an alkyl or alkoxy group.

2. The liquid crystal composition according to claim 1, which comprises at least one member selected from the group consisting of the compounds represented by the general formula (I), at least one member selected from the group consisting of the compounds represented by the general formula (II), and at least one member selected from the group consisting of the compounds represented by the general formulae (IV) to (VII).

3. A record display medium comprising a (liquid crystal)/polymer cmposite film comprising a liquid crystal present in a polymer matrix, the liquid crystal comprising a smectic liquid crystal composition comprising at least one member selected from the group consisting of compounds represented by the following general formula (I):

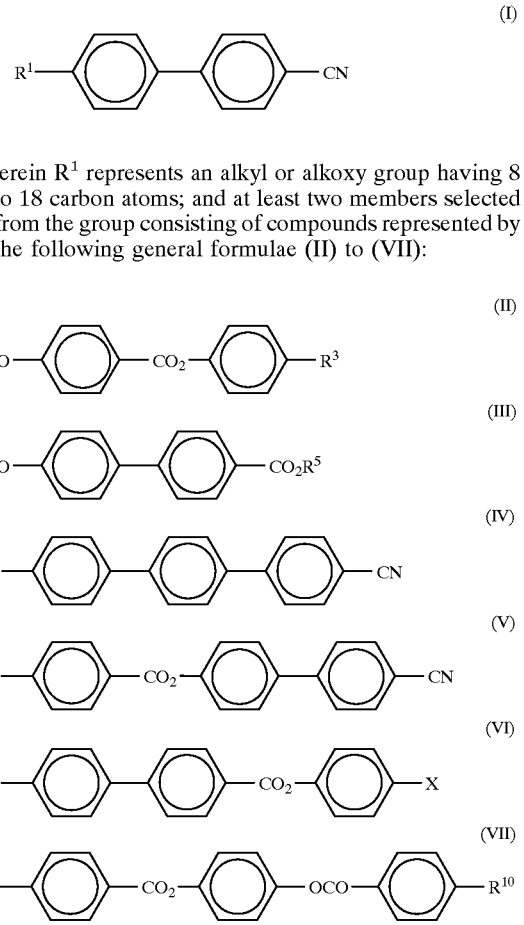

wherein $R^1$ represents an alkyl or alkoxy group having 8 to 18 carbon atoms; and at least two members selected from the group consisting of compounds represented by the following general formulae (II) to (VII):

wherein $R^2$, $R^4$, $R^5$, and $R^6$ represent an alkyl group having 2 to 18 carbon atoms, $R^3$, $R^7$, $R^8$, $R^9$, and $R^{10}$ represent an alkyl or alkoxy group having 2 to 18 carbon atoms, and X represents a halogen atom or an alkyl or alkoxy group having 2 to 18 carbon atoms, said compounds represented by the general formulae (II) to (VII) being incorporated in an amount of 20 to 240 parts by weight based on 100 parts by weight of the compound represented by the general formula (I).

4. The record display medium according to claim 3, wherein the liquid crystal composition is in an enmicrocapsulated state.

5. The recording display medium according to claim 3, wherein the liquid crystal composition contains a dichroic dye.

6. The record display medium according to claim 3, wherein the (liquid crystal)/polymer composite film has been formed by an emulsion process.

7. The recording display medium according to claim 3, wherein the composite film is provided on a conductive substrate.

8. The recording display medium according to claim 3, wherein the composite film has a protective layer thereon.

9. A method for using a recording display medium, comprising the steps of:
providing a recording display medium comprising a conductive substrate and a liquid crystal/polymer composite film comprising a liquid crystal present in a polymer matrix, the liquid crystal comprising a smectic liquid crystal composition comprising at least one member selected from the group consisting of compounds represented by the following general formula (I):

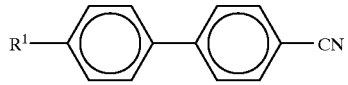
(I)

wherein $R^1$ represents an alkyl or alkoxy group having 8 to 18 carbon atoms; and at least two members selected from the group consisting of compounds represented by the following general formulae (II) to (VII):

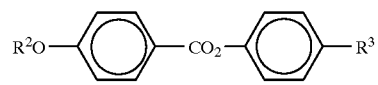
(II)

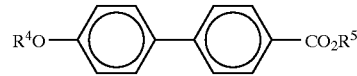
(III)

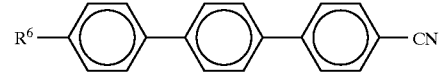
(IV)

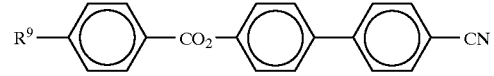
(V)

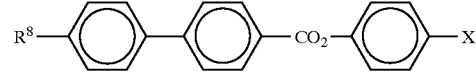
(VI)

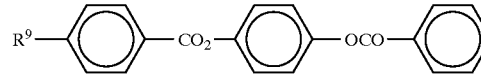
(VII)

wherein $R^2$, $R^4$, $R^5$, and $R^6$ represent an alkyl group having 2 to 18 carbon atoms, $R^3$, $R^7$, $R^8$, $R^9$, and $R^{10}$ represent an alkyl or alkoxy group having 2 to 18 carbon atoms, and X represents a halogen atom or an alkyl or alkoxy group having 2 to 18 carbon atoms, said compounds represented by the general formulae (II) to (VII) being incorporated in an amount of 20 to 240 parts by weight based on 100 parts by weight of the compound represented by the general formula (I);
thermally recording information in the recording display medium; and
erasing the thus recorded information by means of heat or an electric field.

10. A method for using a recording display medium, comprising the steps of:
providing a recording display medium comprising a conductive substrate and a liquid crystal/polymer composite film comprising a liquid crystal present in a polymer matrix, the liquid crystal comprising a smectic liquid crystal composition comprising at least one member selected from the group consisting of compounds represented by the following general formula (I):

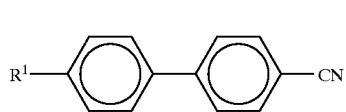
(I)

wherein $R^1$ represents an alkyl or alkoxy group having 8 to 18 carbon atoms; and at least two members selected from the group consisting of compounds represented by the following general formulae (II) to (VII):

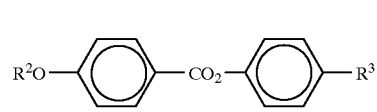
(II)

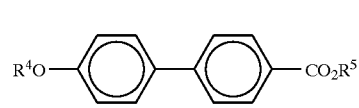
(III)

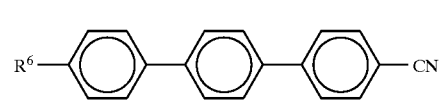
(IV)

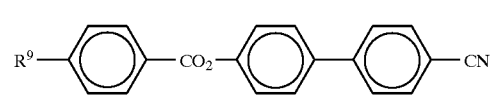
(V)

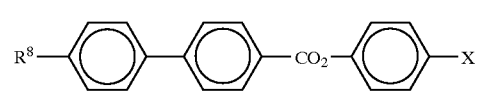
(VI)

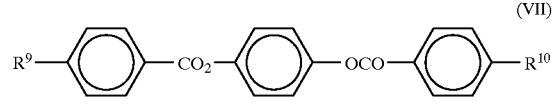
(VII)

wherein $R^2$, $R^4$, $R^5$, and $R^6$ represent an alkyl group having 2 to 18 to carbon atoms, $R^3$, $R^7$, $R^8$, $R^9$, and $R^{10}$ represent an alkyl or alkoxy group having 2 to 18 carbon atoms, and X represents a halogen atom or an alkyl or alkoxy group having 2 to 18 carbon atoms, said compounds represented by the general formulae (II) to (VII) being incorporated in an amount of 20 to 240 parts by weight based on 100 parts by weight of the compound represented by the general formula (I);
recording information in the recording display medium by means of an electric field; and
erasing the thus recorded information by means of heat or an electric field.

* * * * *